(12) United States Patent
Cruz-Hernandez et al.

(10) Patent No.: US 10,146,308 B2
(45) Date of Patent: Dec. 4, 2018

(54) SYSTEMS AND METHODS FOR IMPEDANCE COUPLING FOR HAPTIC DEVICES

(71) Applicant: Immersion Corporation, San Jose, CA (US)

(72) Inventors: Juan Manuel Cruz-Hernandez, Montreal (CA); Danny Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 14/513,851

(22) Filed: Oct. 14, 2014

(65) Prior Publication Data
US 2016/0103489 A1     Apr. 14, 2016

(51) Int. Cl.
G06F 3/01     (2006.01)
G06F 3/044    (2006.01)
G06F 1/16     (2006.01)

(52) U.S. Cl.
CPC .............. G06F 3/016 (2013.01); G06F 1/163 (2013.01)

(58) Field of Classification Search
CPC .......... G06F 3/016; G06F 3/044; G06F 1/163; G06F 3/01
See application file for complete search history.

(56) References Cited

U.S. PATENT DOCUMENTS

| | | | |
|---|---|---|---|
| 6,693,622 B1 | 2/2004 | Shahoian et al. | |
| 7,336,260 B2 | 2/2008 | Martin et al. | |
| 2006/0109201 A1* | 5/2006 | Ryoo | G06F 3/016 345/8 |
| 2007/0063849 A1* | 3/2007 | Rosella | A41D 1/002 340/573.1 |
| 2010/0283727 A1* | 11/2010 | Jiang | G06F 3/016 345/156 |
| 2011/0279250 A1* | 11/2011 | Ryhanen | G06F 3/03547 340/407.2 |
| 2011/0285667 A1 | 11/2011 | Poupyrev | |
| 2012/0133494 A1* | 5/2012 | Cruz-Hernandez | G06F 3/016 340/407.2 |

(Continued)

OTHER PUBLICATIONS

APC Int'l, Ltd. Email Archive Entry for Oct. 24, 2013 (link highlighted and shown at bottom of screenshot). http://archive.constantcontact.com/fs153/1102452069375/archive/1115314608834.html.*

(Continued)

*Primary Examiner* — Md Saiful A Siddiqui
(74) *Attorney, Agent, or Firm* — Kilpatrick Townsend & Stockton LLP

(57) ABSTRACT

One illustrative system disclosed herein includes a haptic output device associated with a surface. The illustrative system also includes a sensor configured to detect a contact between a user and the surface, the sensor configured to transmit a sensor signal including data associated with the contact. The illustrative system further includes a processor in communication with the sensor and the haptic output device, the processor configured to: receive the sensor signal; determine an impedance based at least in part on the sensor signal; and determine a haptic effect based at least in part on the impedance. The processor is further configured to transmit a haptic signal associated with the haptic effect to the haptic output device.

21 Claims, 7 Drawing Sheets

(56) References Cited

U.S. PATENT DOCUMENTS

| | | | |
|---|---|---|---|
| 2012/0268412 A1* | 10/2012 | Cruz-Hernandez | G06F 3/0488 345/174 |
| 2013/0057509 A1* | 3/2013 | Cruz-Hernandez | G06F 3/016 345/174 |
| 2013/0069862 A1* | 3/2013 | Ur | G06F 3/01 345/156 |
| 2013/0191741 A1* | 7/2013 | Dickinson | G06F 1/163 715/702 |
| 2013/0274712 A1* | 10/2013 | Schecter | A61M 25/10 604/510 |
| 2013/0285958 A1* | 10/2013 | Nishimura | G06F 3/0416 345/173 |
| 2013/0321262 A1* | 12/2013 | Schecter | G06F 3/041 345/156 |
| 2014/0362014 A1 | 12/2014 | Ullrich et al. | |
| 2015/0145657 A1 | 5/2015 | Levesque et al. | |
| 2015/0145673 A1* | 5/2015 | Choi | A61B 5/6843 340/539.12 |
| 2016/0058388 A1* | 3/2016 | Kwon | A61B 5/7221 600/547 |

OTHER PUBLICATIONS

APC Int'l Ltd. Email Archive Entry for Oct. 24, 2013 (details of the entry showing dimensions of piezoelectric vibration).*

Kajimoto, Electrotactile Display with Real-Time Impedance Feedback using Pulse Width Modulation, IEEE Transactions on Haptics, vol. 5, No. 2, Apr.-Jun. 2012.

* cited by examiner

SYSTEMS AND METHODS FOR IMPEDANCE COUPLING FOR HAPTIC DEVICES

FIELD OF THE INVENTION

The present invention relates to the field of user interface devices. More specifically, the present invention relates to impedance coupling for haptic device.

BACKGROUND

As computer-based systems become more prevalent, the quality of the interfaces through which humans interact with these systems is becoming increasingly important. Designers often improve the quality of user interfaces through visual, audio, and/or haptic feedback (e.g., mechanical vibrations). The quality of haptic feedback perceived by the user, however, can vary greatly based on how the user interacts with the system and the physical properties of the system itself (e.g., the material making up the housing of the system with which a user may be interacting). Thus, it can be challenging to generate quality haptic feedback.

SUMMARY

Embodiments of the present disclosure comprise computing devices comprising impedance coupling for haptic devices. In one embodiment, a system of the present disclosure may comprise a haptic output device associated with a surface. The system may also comprise a sensor configured to detect a contact between a user and the surface, the sensor configured to transmit a sensor signal comprising data associated with the contact. The system may also comprise a processor in communication with the sensor and the haptic output device, the processor configured to: receive the sensor signal; determine an impedance based on the sensor signal; and determine a haptic effect based at least in part on the impedance. The processor may also be configured to transmit a haptic signal associated with the haptic effect to the haptic output device.

In another embodiment, a method of the present disclosure may comprise: receiving a sensor signal from a sensor, the sensor signal comprising data associated with a contact between a user and a surface associated with a haptic output device; determining an impedance based on the sensor signal; and determining a haptic effect based at least in part on the impedance. The method may further comprise transmitting a haptic signal associated with the haptic effect to the haptic output device. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
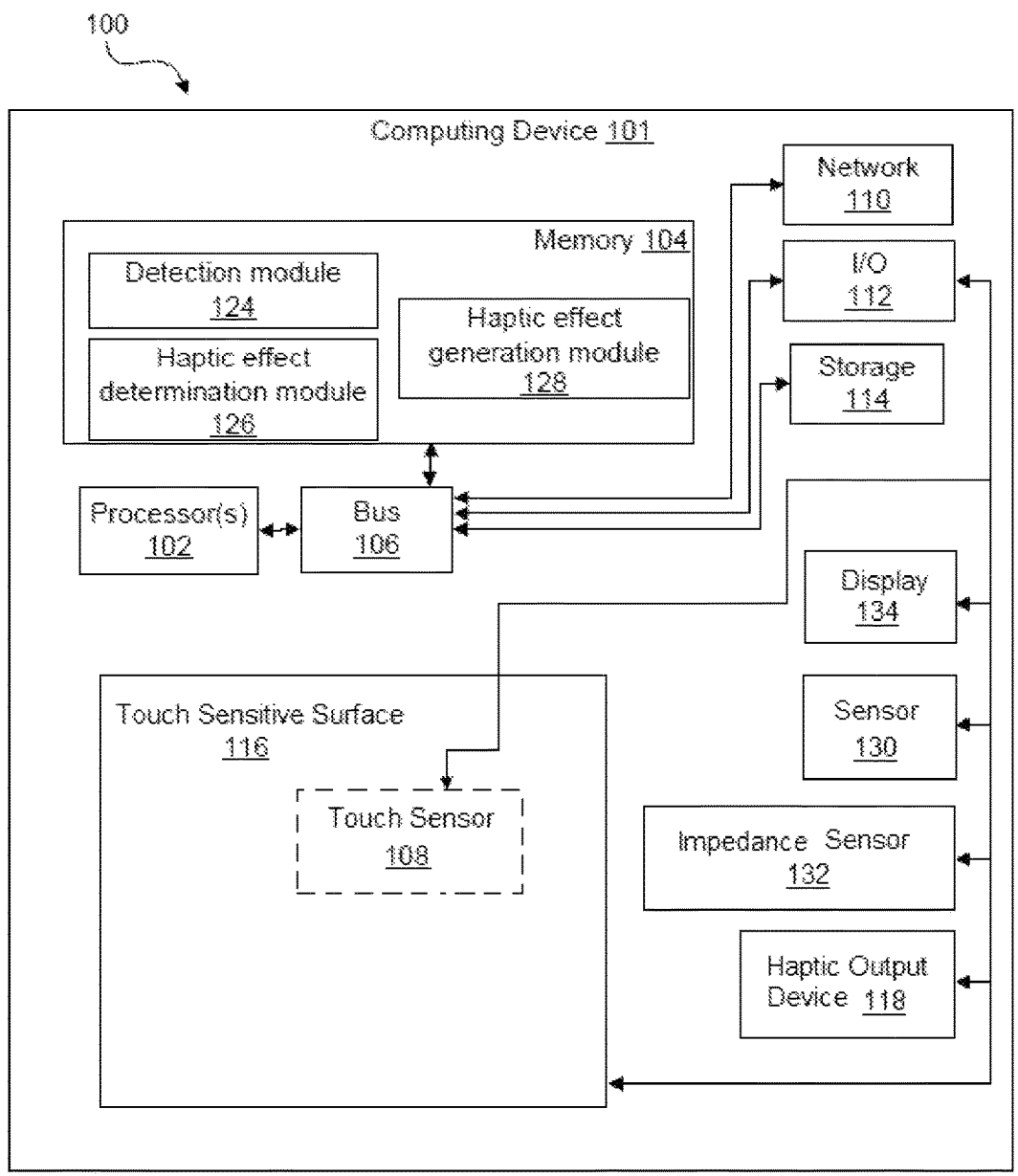
FIG. 1 is a block diagram showing a system for impedance coupling for haptic devices according to one embodiment.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of Impedance Coupling for Haptic Devices

One illustrative embodiment of the present disclosure comprises a gaming system. The gaming system may include a game console, a tablet, a mobile device (e.g., a smart phone), a laptop computer, a desktop computer, or other electronic device. The gaming system is in communication with a user interface device. The user interface device may comprise and/or may be in communication with one or more user input elements (e.g., button, joystick, gyroscope, accelerometer, or touch-sensitive surface) configured to detect a user input.

In the illustrative embodiment, the user interface device comprises an impedance sensor. The impedance sensor is configured to detect an impedance between a user and a surface associated with the user interface device. The impedance is associated with a characteristic of a physical contact (e.g., the amount of surface area, pressure, or electrical conductivity) between the user and the surface. In the illustrative embodiment, low impedance comprises a high quality of contact between the user and the surface, and high impedance comprises a low quality of contact between the user and the surface. For example, the impedance sensor may detect a high impedance if the amount of pressure a user is exerting on the surface (e.g., while holding the user interface device) is low. The impedance sensor is further configured to transmit a sensor signal associated with the detected impedance to the gaming system.

In the illustrative embodiment, the user interface device comprises a haptic output device. The haptic output device is configured to receive a signal from the gaming system and provide one or more haptic effects (e.g., a vibration, a change in a perceivable coefficient of friction, a simulated texture, or a surface deformation) perceivable by a user.

In the illustrative embodiment, the game system outputs a haptic effect via the haptic output device in response to an event. An event, as used herein, is any interaction, action, collision, or other event which occurs during operation of the device which can potentially comprise an associated haptic effect. In some embodiments, an event may comprise user input (e.g., a button press, manipulating a joystick, interacting with a touch-sensitive surface, tilting or orienting the user interface device), a system status (e.g., low battery, low memory, or a system notification, such as a notification generated based on the system receiving an incoming call), sending data, receiving data, or a program event (e.g., if the program is a game, a program event may comprise explosions, gunshots, collisions, interactions between game characters, advancing to a new level, or driving over bumpy terrain). For example, in the illustrative embodiment, the gaming system outputs a haptic effect (e.g., a vibration) upon the occurrence of a game event (e.g., when the user's virtual character is shot).

In the illustrative embodiment, the game system is configured to determine one or more characteristics of the haptic effect (e.g., the type, magnitude, duration, frequency, waveform, or haptic output device through which to output the haptic effect) based at least in part on the impedance. In some embodiments, the quality of a haptic effect perceived by a user may depend on the impedance. Thus, in some embodiments, the user may perceive a more consistent haptic experience if the game system modulates the characteristics of haptic effects based on the impedance. For example, if the game system detects a low impedance, the game system may determine a haptic effect comprising a low-amplitude vibration. If the game system detects a high impedance, the game system may determine a haptic effect comprising a high-amplitude vibration. Due to the different impedances, the user may perceive the low-amplitude vibration and the high-amplitude vibration as substantially the same haptic effect. In other embodiments, the game system may vary the type, duration, frequency, or waveform of the haptic effect, or the haptic output device through which to output the haptic effect, based at least in part on the impedance.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Impedance Coupling for Haptic Effects

FIG. 1 is a block diagram showing a system 100 for impedance coupling for haptic effects according to one embodiment. As shown in FIG. 1 the system 100 comprises a computing device 101. Computing device 101 may comprise, for example, a mobile device, tablet, e-reader, laptop computer, desktop computer, automobile console computer system, medical device, game console, game controller, or portable gaming device. Further, in some embodiments, the computing device 101 may comprise a multifunction controller, for example, a controller for use in a kiosk, automobile, alarm system, thermostat, or other type of computing device. While system 100 is shown as a single device in FIG. 1, in other embodiments, the system 100 may comprise multiple devices, such as a mobile device and one or more remote interface devices.

The computing device comprises a processor 102 in communication with other hardware via bus 106. A memory 104, which can comprise any suitable tangible (and non-transitory) computer-readable medium such as RAM, ROM, EEPROM, or the like, embodies program components that configure operation of the computing device 101. In the embodiment shown, computing device 101 further includes one or more network interface devices 110, input/output (I/O) interface components 112, and storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate wired or wireless connection to devices such as one or more displays 134, game controllers, keyboards, mice, joysticks, cameras, buttons, speakers, microphones, and/or other hardware used to input data or output data. Storage 114 represents nonvolatile storage such as magnetic, optical, or other storage media included in computing device 101 or coupled to processor 102.

System 100 further includes a touch sensitive surface 116, which, in this example, is integrated into computing device 101. Touch sensitive surface 116 represents any surface that is configured to sense tactile input of a user. One or more touch sensors 108 are configured to detect a touch in a touch area when an object contacts a touch sensitive surface 116 and provide appropriate data for use by processor 102. Any suitable number, type, or arrangement of sensors can be used. For example, resistive and/or capacitive sensors may be embedded in touch sensitive surface 116 and used to determine the location of a touch and other information, such as pressure, speed, and/or direction. As another example, optical sensors with a view of the touch sensitive surface 116 may be used to determine the touch position.

In other embodiments, the touch sensor 108 may comprise a LED detector. For example, in one embodiment, touch sensitive surface 116 may comprise a LED finger detector mounted on the side of a display 134. In some embodiments, the processor 102 is in communication with a single touch sensor 108, in other embodiments, the processor 102 is in communication with a plurality of touch sensors 108, for example, a first touch-screen and a second touch screen. The touch sensor 108 is configured to detect user interaction, and based on the user interaction, transmit signals to processor 102. In some embodiments, touch sensor 108 may be configured to detect multiple aspects of the user interaction. For example, touch sensor 108 may detect the speed and pressure of a user interaction, and incorporate this information into the interface signal.

Touch sensitive surface 116 may or may not comprise (or otherwise correspond to) the display 134, depending on the particular configuration of the system 100. Some embodiments include a touch enabled display that combines a touch sensitive surface 116 and a display 134 of the device. The touch sensitive surface 116 may correspond to the display 134 exterior or one or more layers of material above components shown on the display 134.

Figure 2:
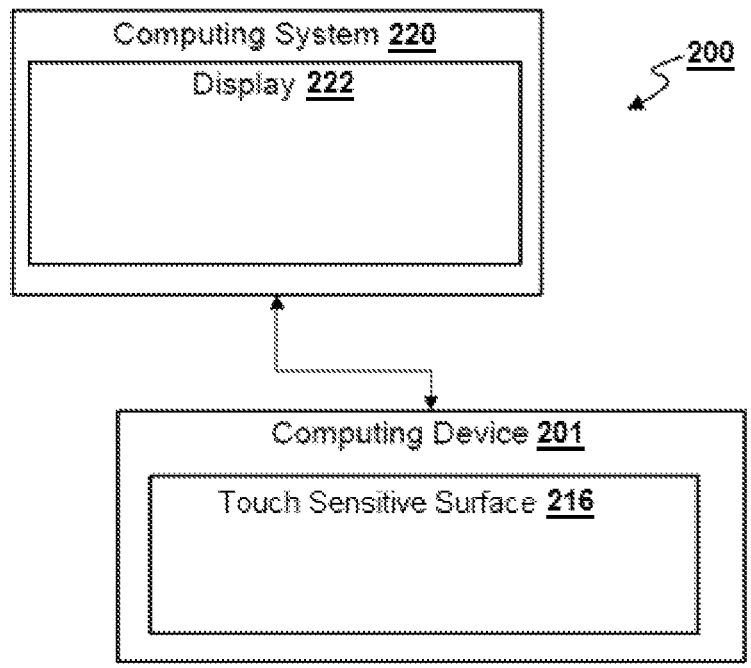
FIG. 2 is still another block diagram showing a system for impedance coupling for haptic devices according to one embodiment.

In some embodiments, the computing device 101 comprises a touch sensitive surface 116 that may be mapped to a graphical user interface provided in a display 134 included in system 100 and interfaced to computing device 101. For example, as shown in FIG. 2, computing device 201 comprises a touch sensitive surface 216, which may be mapped to a graphical user interface provided in a display 222 included in computing system 220. Computing system 220 is communicatively coupled to computing device 201. The computing device 201 may comprise, for example, a mouse, trackpad, or other device. The computing system 220 may comprise, for example, a laptop computer, desktop computer, set-top box (e.g., DVD player, DVR, cable television box), or another computing system. Whether integrated with a display 222 or otherwise, the depiction of planar touch sensitive surfaces 216 in the examples herein is not meant to be limiting. Other embodiments may comprise curved or irregular touch sensitive surfaces 216.

Returning to FIG. 1, the system 100 comprises an impedance sensor 132. The impedance sensor 132 is configured to detect an impedance between a user and a surface associated with a haptic output device 118 (described in further detail below). The impedance sensor 132 is further configured to transmit a sensor signal associated with the impedance to processor 102. In some embodiments, the impedance sensor 132 may comprise, for example, a pressure sensor, force sensor, capacitive sensor, voltage or current sensor, skin conductance or resistance sensor, optical or infrared sensor, range or depth sensor, or an accelerometer.

In some embodiments, the impedance sensor 132 may comprise a plurality of electrodes. The electrodes may be positioned to contact the user's skin. In some embodiments, the computing device 101 may transmit electricity (e.g., short pulses) to an electrode and measure the conductivity of the user's skin. In other embodiments, the computing device 101 may transmit electricity to the electrodes and measure the voltage across two points on a user's skin. Based on the conductivity or the voltage, the computing device 101 may determine a characteristic of the contact (e.g., the conductivity or the surface area of the contact) between the user and a surface associated with the haptic output device 118.

Figure 1A:
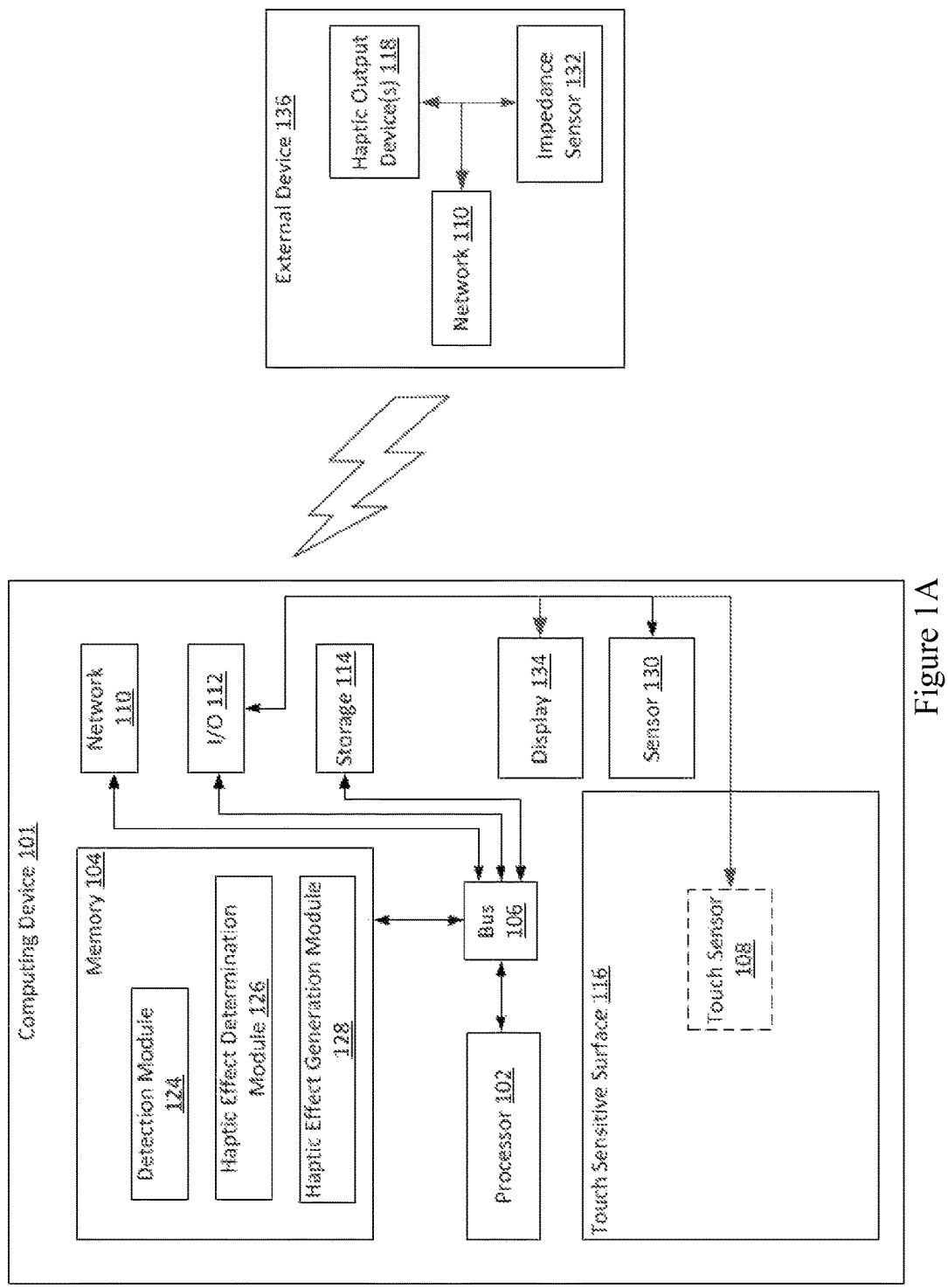
FIG. 1A is another block diagram of a system for impedance coupling for haptic devices according to one embodiment.

In some embodiments, the processor 102 may be in communication with a single impedance sensor 132 and, in other embodiments, the processor 102 may be in communication with a plurality of impedance sensors 132. The plurality of impedance sensors 132 may comprise impedance sensors 132 of the same type (e.g., two pressure sensors) or impedance sensors 132 of different types (e.g., a pressure sensor and a capacitive sensor). Although depicted in FIG. 1 as internal to the computing device 101, in some embodiments, the impedance sensor 132 may be external to and in communication with the computing device 101, for example, as shown in FIG. 1A. In some embodiments, the one or more impedance sensors 132 may be associated with a wearable device (e.g., shoes, a sleeve, a jacket, glasses, a glove, a ring, a watch, a wristband, a bracelet, collar, shirt, an article of clothing, a hat, a headband, and/or jewelry). The wearable device may be associated with a part of a user's body, for example, a user's finger, arm, hand, foot, leg, head, or other body part.

The system 100 comprises one or more additional sensors 130. In some embodiments, the sensor 130 may comprise, for example, a camera, gyroscope, accelerometer, humidity sensor, skin conductance or resistance sensor, ambient light sensor, global positioning system (GPS) unit, temperature sensor, strain gauge, force sensor, or a range sensor or depth sensor. In some embodiments, the gyroscope, accelerometer, and GPS unit may detect an orientation, acceleration, and location of computing device 101, respectively. In some embodiments, the camera, range sensor, and/or depth sensor may detect a distance between computing device 101 and an external object (e.g., a user's hand, head, arm, foot, or leg; another person; an automobile; a tree; a building; or a piece of furniture). Although the embodiment shown in FIG. 1 depicts the sensor 130 internal to computing device 101, in some embodiments, sensor 130 may be external to computing device 101. For example, in some embodiments, the one or more sensors 130 may be associated with a wearable device and/or coupled to a user's body. In some embodiments, the processor 102 may be in communication with a single sensor 130 and, in other embodiments, the processor 102 may be in communication with a plurality of sensors 130, for example, a gyroscope and a humidity sensor. The sensor 130 is configured to transmit a sensor 130 signal to processor 102.

System 100 further includes haptic output device 118 in communication with processor 102. The haptic output device 118 is configured to output an effect in response to a haptic signal. In some embodiments, the haptic output device 118 is configured to output a haptic effect comprising, for example, a vibration, a change in a perceived coefficient of friction, a simulated texture, a change in temperature, a stroking sensation, an electro-tactile effect, or a surface deformation.

In the embodiment shown in FIG. 1, the haptic output device 118 is in communication with processor 102 and internal to computing device 101. In other embodiments, the haptic output device 118 may be remote from computing device 101, but communicatively coupled to processor 102, for example, as shown in FIG. 1A. For instance, haptic output device 118 may be external to and in communication with computing device 101 via wired interfaces such as Ethernet, USB, IEEE 1394, and/or wireless interfaces such as IEEE 802.11, Bluetooth, or radio interfaces. In some embodiments, the haptic output device 118 may be coupled to a wearable device that may be remote from the computing device 101.

In some embodiments, the haptic output device 118 may be configured to output a haptic effect comprising a vibration. The haptic output device 118 may comprise, for example, one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some embodiments, haptic output device 118 may be configured to output a haptic effect modulating the perceived coefficient of friction on the touch sensitive surface 116 in response to a haptic signal. In one embodiment, the haptic output device 118 comprises an ultrasonic actuator. An ultrasonic actuator may vibrate at an ultrasonic frequency, for example 20 kHz, increasing or reducing the perceived coefficient at the surface of touch sensitive surface 116. In some embodiments, the ultrasonic actuator may comprise a piezo-electric material.

In some embodiments, haptic output device 118 may use electrostatic attraction, for example by use of an electrostatic actuator, to output a haptic effect. In such an embodiment, the haptic effect may comprise a simulated texture, a simulated vibration, a stroking sensation, or a perceived change in a coefficient of friction on a surface associated with computing device 101 (e.g., touch sensitive surface 116). In some embodiments, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 102 may operate the electrostatic actuator by applying an electric signal, for example an AC signal, to the conducting layer. In some embodiments, a high-voltage amplifier may generate the AC signal. The electric signal may generate a capacitive coupling between the conducting layer and an object (e.g., a user's finger, head, foot, arm, shoulder, leg, or other body part, or a stylus) near or touching the haptic output device 118. In some embodiments, varying the levels of attraction between the object and the conducting layer can vary the haptic effect perceived by a user interacting with the computing device 101.

In some embodiments, the user does not have to move a body part across a surface associated with the electrostatic actuator to perceive the haptic effect. Nor does the user have to tap to the surface associated with the electrostatic actuator to perceive the haptic effect. Rather, the user may maintain continuous contact (e.g., by gripping or holding) with a surface associated with the electrostatic actuator and perceive the haptic effect. An electrostatic haptic effect that is perceptible to a user without user movement in the directions tangential or perpendicular to a surface will be referred to hereinafter as a "static ESF effect."

In some embodiments, the haptic output device 118 may comprise a deformation device. The deformation device may be configured to output a haptic effect by deforming a surface associated with the haptic output device 118 (e.g., a housing of the computing device 101 or the touch sensitive surface 116). In some embodiments, haptic output device 118 may comprise a smart gel that responds to stimulus or stimuli by changing in stiffness, volume, transparency, and/or color. In some embodiments, stiffness may comprise the resistance of a surface associated with the haptic output device 118 against deformation. In one embodiment, one or more wires are embedded in or coupled to the smart gel. As current runs through the wires, heat is emitted, causing the smart gel to expand or contract, deforming the surface associated with the haptic output device 118. In some embodiments, the haptic output device 118 may comprise a rheological (e.g., a magneto-rheological or electro-rheological) fluid. A rheological fluid may comprise metal particles (e.g., iron particles) suspended in a fluid (e.g., oil or water). In response to an electric or magnetic field, the order of the molecules in the fluid may realign themselves, which may change the overall damping and/or viscosity of the fluid, deforming the haptic output device 118.

In other embodiments, the haptic output device 118 may comprise an actuator coupled to an arm that rotates a deformation component. The actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move a surface associated with the haptic output device 118, causing it to deform. In some embodiments, the haptic output device 118 may comprise a portion of the housing of the computing device 101 or a component of the computing device 101. In other embodiments, the haptic output device 118 may be housed inside a flexible housing overlaying the computing device 101 or a component of the computing device 101.

In some embodiments, the haptic output device 118 may be configured to output a thermal or electro-tactile haptic effect. For example, the haptic output device 118 may be configured to output a haptic effect comprising a change in a temperature of a surface associated with the haptic output device 118. In some embodiments, the haptic output device 118 may comprise a conductor (e.g., a wire or electrode) for outputting a thermal or electro-tactile effect. For example, in some embodiments, the haptic output device 118 may comprise a conductor embedded in a surface associated with the haptic output device 118. The computing device 101 may output a haptic effect by transmitting current to the conductor. The conductor may receive the current and, for example, generate heat, thereby outputting the haptic effect.

Although a single haptic output device 118 is shown here, some embodiments may use multiple haptic output devices of the same or different type to provide haptic feedback. Some haptic effects may utilize an actuator coupled to a housing of the device, and some haptic effects may use multiple actuators in sequence and/or in concert. For example, in some embodiments, multiple vibrating actuators and electrostatic actuators can be used alone or in concert to provide different haptic effects. In some embodiments, the haptic output device 118 may comprise a solenoid or other force or displacement actuator, which may be coupled to the touch sensitive surface 116. Further, the haptic output device 118 may be either rigid or flexible.

Turning to memory 104, program components 124, 126, and 128 are depicted to show how a device can be configured in some embodiments to provide impedance coupling for haptic devices. In this example, a detection module 124 configures the processor 102 to monitor touch sensitive surface 116 via touch sensor 108 to determine a position of a touch. For example, module 124 may sample touch sensor 108 to track the presence or absence of a touch and, if a touch is present, to track one or more of the location, path, velocity, acceleration, pressure and/or other characteristics of the touch over time.

Haptic effect determination module 126 represents a program component that analyzes data to determine a haptic effect to generate. In some embodiments, haptic effect determination module 126 may determine a haptic effect based at least in part on an event. For example, the haptic effect determination module 126 may comprise code that determines, based an interaction with the touch sensitive surface 116, a haptic effect to output and code that selects one or more haptic effects to provide in order to output the effect. For example, in some embodiments, some or all of the area of touch sensitive surface 116 may be mapped to a graphical user interface. Haptic effect determination module 126 may select a haptic effect based on the location of a touch to simulate the presence of a virtual object (e.g., a virtual avatar, automobile, animal, cartoon character, button, lever, logo, or person) on the surface of the touch sensitive surface 116. In some embodiments, these features may correspond to a visible representation of the feature on the interface. However, haptic effects may be output even if a corresponding element is not displayed in the interface (e.g., a haptic effect may be provided if a boundary in the interface is crossed, even if the boundary is not displayed).

In some embodiments, the haptic effect determination module 126 may select a haptic effect based at least in part a characteristic (e.g., a virtual size, width, length, color, texture, material, trajectory, type, movement, pattern, or location) associated with a virtual object. For example, in one embodiment, the haptic effect determination module 126 may determine a haptic effect comprising a vibration if a color associated with the virtual object is blue. In such an embodiment, the haptic effect determination module 126 may determine a haptic effect comprising a change in temperature if a color associated with the virtual object is red. As another example, the haptic effect determination module 126 may determine a haptic effect configured to simulate the texture of sand if the virtual object comprises an associated virtual texture that is sandy or coarse.

In some embodiments, the haptic effect determination module 126 may select a haptic effect based at least in part on a sensor signal from the impedance sensor 132. For example, the haptic effect determination module 126 may select a haptic effect based on the amount of pressure a user exerts against a surface associated with the haptic output device 118. For instance, the haptic effect determination module 126 may determine a haptic effect comprising a vibration if the amount of pressure exerted by the user against the surface is low. The haptic effect determination module 126 may determine a haptic effect comprising a change in the temperature of a surface associated with the computing device 101 if the amount of pressure exerted by the user against the surface is high.

As another example, in some embodiments, the haptic effect determination module 126 may determine a haptic effect based on an area of contact between the user (e.g., the user's finger) and a surface associated with the haptic output device 118. For example, in some embodiments, as the contact surface area increases, the user may perceive a stronger haptic effect. In response to an increased surface contact area, the haptic effect determination module 126 may determine a haptic effect comprising a decreased magnitude. The decreased magnitude may offset the effect of the increased contact surface area, so that the user perceives the overall haptic effect as having a relatively constant strength.

As still another example, in some embodiments, the haptic effect determination module 126 may select a haptic effect based on electrical conductivity between a user and a surface associated with the haptic output device 118. For instance, if the conductivity is high the haptic effect determination module 126 may determine an electro-tactile haptic effect. In such an embodiment, if the conductivity is low the haptic effect determination module 126 may determine a haptic effect comprising a vibration.

In some embodiments, the haptic effect determination module 126 may modify a characteristic of the haptic effect based on environmental characteristics or the characteristics of the user, e.g., the ambient humidity or temperature, or the thickness, moisture level, amount of hair, or other characteristic of the user's skin. For example, in some embodiments, fluid or another substance on the user's skin may affect the conductivity determined by the computing device 101. The haptic effect determination module 126 may therefore calibrate the haptic effect based on this fluid or other substance. In still other embodiments, the haptic effect determination module 126 may calibrate the haptic effect based on whether the user's skin is dry.

In some embodiments, the haptic effect determination module 126 may comprise a finite state machine. A finite state machine comprises a machine that changes state based on the current state and an input. Upon applying an input to the finite state machine, the finite state machine may transition from a current state to a new state. In such an embodiment, the finite state machine may select haptic effects based on the transition between states. In some embodiments, these state transitions may be driven based in part on a sensor signal from the impedance sensor 132.

In some embodiments, haptic effect determination module 126 may comprise code that determines, based on signals from sensor 130 (e.g., a temperature, an amount of ambient light, an accelerometer measurement, or a gyroscope measurement), a haptic effect to output. For example, in some embodiments, the haptic effect determination module 126 may determine a haptic effect based on the temperature. For instance, in one such embodiment, the haptic effect determination module 126 is configured to output a thermal haptic effect in response to an event. However, because the ambient temperature may be high, the user may be unable to perceive a quality thermal haptic effect. Thus, the haptic effect determination module 126 may detect the ambient temperature and determine a different type of haptic effect, for example, a vibration. As another example, in some embodiments, the haptic effect determination module 126 may determine a haptic effect based on accelerometer measurements. For instance, in one such embodiment, the haptic effect determination module 126 is configured to output a haptic effect comprising a vibration in response to an event. However, because the user may be riding in a car or biking over bump terrain, the user may be unable to perceive a quality vibratory haptic effect. In such an embodiment, the haptic effect determination module 126 may detect the vibrations from the accelerometer and determine a different type of haptic effect, for example, a thermal haptic effect.

Haptic effect generation module 128 represents programming that causes processor 102 to transmit a haptic signal to haptic output device 118 to generate the selected haptic effect. For example, haptic effect generation module 128 may access stored waveforms or commands to send to haptic output device 118. As another example, haptic effect generation module 128 may comprise algorithms to determine the haptic signal. Haptic effect generation module 128 may comprise algorithms to determine target coordinates for the haptic effect. These target coordinates may comprise, for example, a location on the touch sensitive surface 116.

Figure 3:
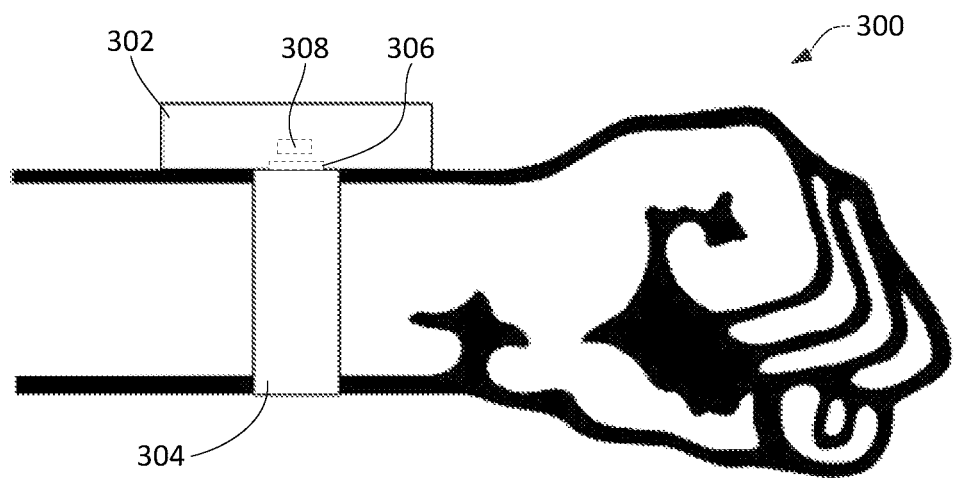
FIG. 3 shows an embodiment of a system for impedance coupling for haptic devices.

FIG. 3 shows an embodiment of a system for impedance coupling for haptic devices. The system 300 comprises a computing device 302. As noted above, the computing device 302 may be, or may be associated with, a wearable device, such as a hat, sleeve, jacket, collar, glasses, glove, ring, article of clothing, wristband, headband, and/or jewelry. In the embodiment shown in FIG. 3, the computing device 302 comprises a watch, such as a smart watch. A smart watch comprises a computerized wristwatch that may include functionality beyond timekeeping. A strap 304 is coupled to the computing device 302 and for positioning the computing device 302, for example, to secure the computing device 302 on the user's wrist.

The system 300 comprises an impedance sensor 306. The impedance sensor 306 is configured to determine the impedance between the user (e.g., the user's wrist) and a haptic output device 308 and transmit a sensor signal to a processor. In some embodiments, the entire strap 304 may comprise the impedance sensor 306. For example, in one embodiment, the entire strap 304 comprises an impedance sensor 306 comprising a capacitive sensor. Thus, user interaction with any portion of the band may be detected by the capacitive sensor. In other embodiments, the system 300 may comprise a plurality of impedance sensors 306.

Further, the computing device 302 comprises a haptic output device 308 for outputting a haptic effect to the user (e.g., the user's wrist). The computing device 302 may output a haptic effect (e.g., a vibration) upon the occurrence of an event, for example, a change in the hour. In such an embodiment, the haptic effect may notify the user that the hour has changed.

In some embodiments, the computing device 302 may determine a haptic effect based at least in part on the sensor signal from the impedance sensor 306. For example, in some embodiments, the strap 304 may be loose. The looseness of the strap may generate inconsistent or minimal contact between the user and the computing device 302 (i.e., a high impedance). The impedance sensor 306 may detect the high impedance and transmit a sensor signal to the processor. Based on the sensor signal, the computing device 302 may determine a haptic effect comprising a high magnitude (e.g., an intense vibration). The high magnitude of the haptic effect may allow the user to perceive the haptic effect, even though the impedance between the user and the computing device 302 is low. As another example, in some embodiments, the strap 304 may be tight. The tightness of the strap may generate a consistent, solid contact between the user and the computing device 302 (i.e., a low impedance). The impedance sensor 306 may detect the low impedance and transmit a sensor signal to the processor. Based on the sensor signal, the computing device 302 may determine a haptic effect comprising a low magnitude (e.g., a weak vibration). The low magnitude of the haptic effect may be sufficient to allow the user to perceive the haptic effect due to the low impedance between the user and the computing device 302. Thus, in some embodiments, the computing device 302 may provide a consistent haptic effect to the user while conserving energy, for example, by operating the haptic output device 308 with only an amount of power necessary to allow the user to sufficiently perceive the haptic effect.

In some embodiments, the computing device 302 may modify the type of haptic effect to output based at least in part on the sensor signal from the impedance sensor 306. In some embodiments, the quality of a type of haptic effect perceived by the user may depend on the impedance. For example, if the user's wrist is moving across a surface associated with the haptic output device, the impedance sensor 306 may determine a high impedance because of the inconsistent amount or position of the contact between the user and the computing device 302. However, in such an embodiment, the user may perceive higher quality deformation haptic effects due to the motion, because a user may be able to better perceive deformations by moving the user's wrist across it. Further, the quality of, for instance, a thermal or vibratory haptic effect may remain unchanged. As another example, if the user's wrist is moist, the impedance sensor 302 may determine a low impedance due to the improved electrical conductivity between the user and the computing device 302. However, in such an embodiment, the user may perceive lower quality electro-tactile haptic effects while, for example, the quality of a vibratory haptic effect perceived by a user may remain unchanged.

As a particular example, in some embodiments, the computing device 302 may be configured to output an electrostatic haptic effect upon the occurrence of an event. The computing device 302 may determine, however, that the impedance between the user and the computing device 302 is insufficient to generate a quality electrostatic haptic effect. For instance, if there is high impedance, the computing device 302 may be unable to generate a sufficient capacitive coupling with the user to output a quality electrostatic haptic effect. In such an embodiment, the computing device 302 may determine a different type of haptic effect based on the impedance measurement. For example, in such an embodiment the haptic device may determine a vibration rather than an ESF-based effect. Because the quality of a vibration perceived by the user does not depend on the capacitive coupling between the user and the computing device 302, the user may perceive a quality vibration even if the quality of an ESF-based haptic effect may be low. Thus, the computing device 302 may vary the type of haptic effect output based on the impedance to, for example, provide consistently high quality haptic effects to the user.

In some embodiments, the computing device 302 may comprise a device configured to be held or grasped. For example, the computing device 302 may comprise a laptop computer, a gear shifter, a steering wheel, a mouse, a keyboard, a joystick, a stylus, a tablet, an e-reader, a remote control, a gamepad, or a mobile device. The impedance sensor 306 may be configured to determine the impedance between the user (e.g., the user's hand or palm) and a haptic output device 308 and transmit a sensor signal to a processor. In some embodiments, the impedance may be associated with how the user is gripping or holding the computing device 302 (e.g., the specific configuration of the user's hand or fingers, or how tightly the user is holding the computing device 302). For example, if the user is holding the computing device 302 tightly, the impedance sensor 306 may detect a low impedance. In some embodiments, the computing device 302 may determine a characteristic of a haptic effect to output to a user based on the sensor signal (e.g., using any of the methods described above). For example, based on the sensor signal, the computing device 302 may determine a haptic effect comprising a low magnitude (e.g., a weak vibration).

Figure 4:
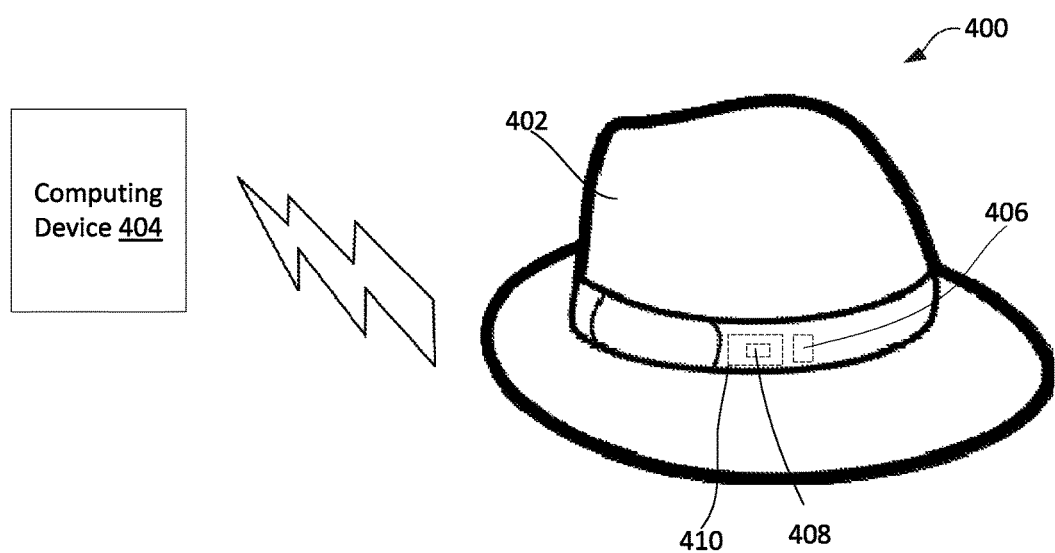
FIG. 4 shows another embodiment of a system for impedance coupling for haptic devices.

FIG. 4 shows another embodiment of a system for impedance coupling for haptic devices. The system 400 comprises a computing device 404 in communication with a haptic output device 408 and an impedance sensor 406. In this example, the system 400 comprises a wearable device 402 (e.g., a hat). However, as noted above, in other embodiments, the system 400 may comprise a graspable device or other device instead of or in addition to a wearable device 402.

Further, the system 400 comprises a compliant material 410. The compliant material 410 may be rigid or flexible. In this example, the compliant material 410 surrounds the haptic output device 408. In other embodiments, such as the embodiment shown in FIG. 5, the compliant material 410 may not surround the haptic output device 408. Further, in some embodiments, the system 400 may comprise a plurality of compliant materials 410, for example, with different physical properties.

In some embodiments, the compliant material 410 may enhance the haptic effect output by the haptic output device 408. For example, in some embodiments, the compliant material 410 may comprise rubber or an elastomer. The elasticity of the compliant material 410 may improve the haptic effect perceived by a user, for example, by allowing the haptic output device 408 to freely move within the compliant material 410 when actuated. For instance, in an embodiment in which the haptic output device 408 (e.g., an ERM) is configured to output a vibration, the haptic output device 408 may be able to vibrate freely within the compliant material. This may allow the haptic output device 408 to transfer energy to the user with minimal damping from the wearable device 402 (e.g., the material in the wearable device 402). Conversely, traditional haptic output devices 408 may be rigidly mounted, for example, to the wearable device 402. The rigid mounting may cause energy from the haptic output device 408 to transfer to the wearable device 402, rather than to the user, which can dampen the haptic effect perceived by the user.

In some embodiments, one or more characteristics (e.g., shape, length, width, height, or elasticity) of the compliant material 410 may be changeable in response to a signal from the computing device 404. For example, in some embodiments, the compliant material 410 may comprise a smart gel, shape-memory alloy, or rheological fluid. The computing device 404 may cause a characteristic of the compliant material 410 to change by applying, e.g., electricity, heat, a magnetic field, or an electric field to the compliant material 410. For example, in some embodiments, the computing device 404 may determine a haptic effect comprising a low magnitude. The computing device 404 may apply a magnetic field to a magneto-rheological fluid in the compliant material 410, causing the fluid to change viscosity. This may make the compliant material 410 more rigid, thereby decreasing the strength of a haptic effect perceived by the user.

In some embodiments, the computing device 404 may cause a characteristic of the compliant material 410 to change based at least in part on the sensor signal from the impedance sensor 406. For example, in some embodiments, the wearable device 402 may be loose on the user's head. Based on the high impedance, the computing device 302 may determine a haptic effect with a high magnitude. However, outputting haptic effect with a high magnitude may require a substantial amount of power. Thus, in some embodiments, the computing device 404 may instead cause the compliant material 410 to become more elastic. The elasticity of the compliant material 410 may allow more haptic forces to be transmitted to the user, which the user may perceive as a haptic effect with a greater magnitude. Further, modifying the elasticity may allow gravitational forces to pull the haptic output device 408 physically closer to the user, for example to the user's head. This may increase the strength of the haptic effect perceived by the user without requiring substantial power.

Figure 5:
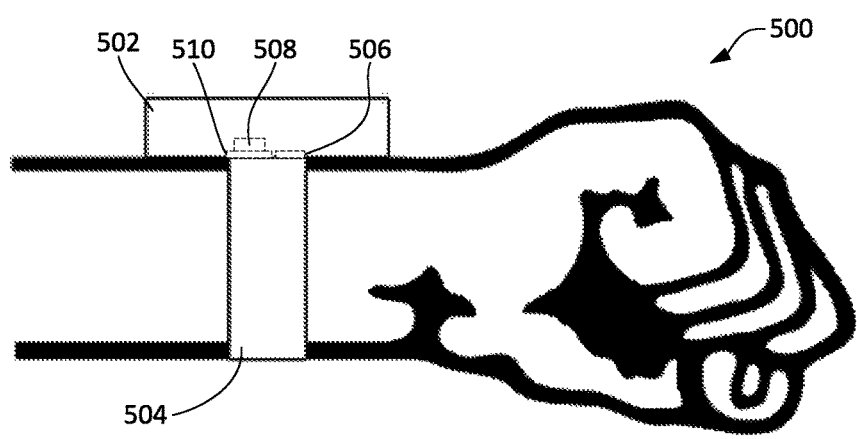
FIG. 5 shows still another embodiment of a system for impedance coupling for haptic devices.

FIG. 5 shows still another embodiment of a system for impedance coupling for haptic devices. The system 500 comprises a computing device 502, strap 504, haptic output device 508, and impedance sensor 506 configured substantially the same as the embodiment shown in FIG. 3.

In this example, a compliant material 510 is positioned between the user (e.g., the user's wrist) and the haptic output device 508. However, in other embodiments, the compliant material 510 may be positioned elsewhere within the system 500 (e.g., coupled to the sides or top of the haptic output device 508, or coupled to the strap 504).

In some embodiments, the compliant material 510 may be configured to provide space between the haptic output device 508 and the user. The spacing may improve the quality of a haptic effect perceived by a user. For example, in some embodiments, the quality of a haptic effect perceived by a user may be based on the distance between the user and the haptic output device 508 (e.g., an electrostatic actuator). In such an embodiment, if the user is too close or applies too much pressure to the haptic output device 508, the user may dampen the haptic effect and therefore perceive a weak haptic effect. Thus, positioning the compliant material 510 between the user and the haptic output device 508 may ensure that the user is a distance from the haptic output device 508 necessary to generate a quality haptic effect.

In some embodiments, the computing device 502 may cause the compliant material 510 to physically move the haptic output device 508. For example, in some embodiments, the computing device 502 may determine that the haptic output device 508 may be too close to the user to generate a quality electrostatic haptic effect. In such an embodiment, the computing device 502 may cause the compliant material 510 to change shape, for example, to become thicker. For example, if the compliant material 510 comprises a smart gel, the computing device 502 may apply an electric signal to wires embedded within the smart gel. The electric signal may cause the wires to generate heat, which may cause the compliant material 510 to expand. This may mechanically move the haptic output device 508 farther from the user (e.g., the user's wrist), allowing for the computing device 502 to output a quality haptic effect.

Figure 6:
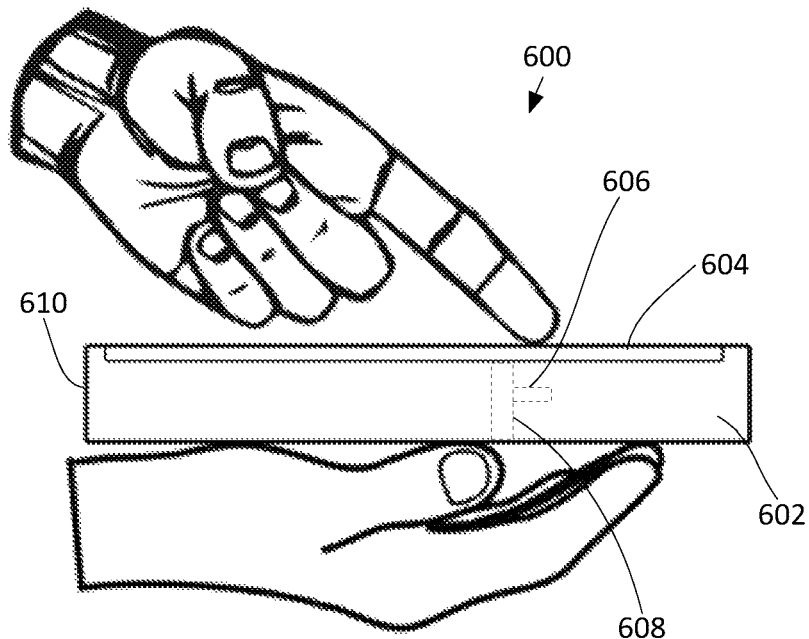
FIG. 6 shows yet another embodiment of a system for impedance coupling for haptic devices.

FIG. 6 shows yet another embodiment of a system for impedance coupling for haptic devices. The system 600 comprises a computing device 602. In this example, the computing device 602 comprises a tablet, e-reader, or mobile device. A haptic output device 606 is positioned within the housing 610 of the computing device 602.

In some embodiments, the haptic output device 606 may be coupled to an actuation system 608. The actuation system 608 may be configured to change the physical location of the haptic output device 606 (e.g., within the housing 610) in response to a signal from the computing device 602. The actuation system 608 may comprise, for example, a motor, a smart gel, a rheological fluid, or other device.

In some embodiments, the actuation system 608 may be configured to change the physical location of the haptic output device 606 based at least in part on a sensor signal from an impedance sensor (not shown). For example, in some embodiments, an impedance sensor may be coupled to the touch-screen display 604. The computing device 602 may be configured to output a haptic effect to the touch-screen display 604 if the impedance sensor detects low impedance between the user and the touch-screen display 604. In such an embodiment, the actuation system 608 may move the haptic output device 606 physically closer to the touch-screen display 604. This may cause the user to perceive a high-magnitude haptic effect via the touch-screen display 604, rather than the lower-magnitude haptic effect the user may feel if the haptic output device 606 was physically farther from the touch-screen display 604. Further, in some embodiments, the computing device 602 may be configured to output a haptic effect to the back of the computing device 602 if the impedance sensor detects a high impedance. In such an embodiment, the actuation system 608 may move the haptic output device 606 physically closer to the back of the computing device 602. This may cause the user to perceive a haptic effect via the back of the computing device 602, for example, in the user's palm as the user holds the computing device 602.

In some embodiments, the actuation system 608 may be able to move the haptic output device 606 in multiple dimensions. For example, the actuation system 608 may be able to move the haptic output device 606 horizontally, vertically, or both. Thus, the actuation system 608 may allow the haptic output device 606 to output haptic effects from multiple locations within the computing device 602 and/or with varying characteristics. This may, for example, provide a greater range of haptic effects and a more immersive user experience while minimizing the need for multiple haptic output devices.

Figure 7:
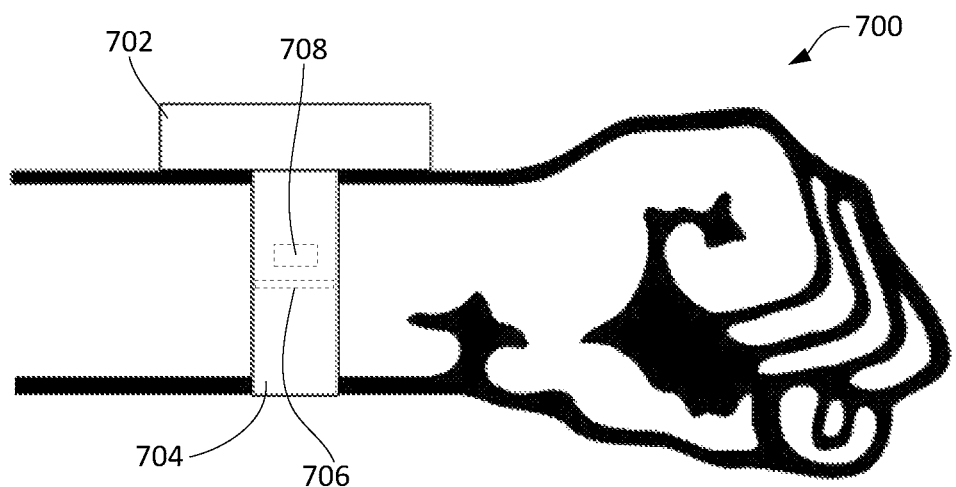
FIG. 7 shows another embodiment of a system for impedance coupling for haptic devices.

FIG. 7 shows another embodiment of a system for impedance coupling for haptic devices. The system 700 comprises a computing device 702 and a strap 704. In this example, the strap 704 may comprise the compliant material. For example, the strap 704 may comprise a rubber, elastomer, smart gel, or rheological fluid. In some embodiments, the entire strap 704 may comprise the compliant material.

In the embodiment shown in FIG. 7, the computing device 702 is configured to change the impedance between the user and the haptic output device 708 based at least in part on a sensor signal from an impedance sensor 706. For example, in some embodiments, the computing device 702 may determine (e.g., based on the impedance) that the strap 704 may be too loose for the haptic output device 708 to output a quality haptic effect to the user. Thus, in some embodiments, the computing device 702 may modify a physical property of the strap 704. For example, the computing device 702 may apply, e.g., heat, electricity, a magnetic field, or an electric field to a smart gel associated with the strap 704. This may cause the physical shape of the strap 704 to change, for example to become thicker, tightening the strap 704 around the user's wrist and thereby improving the impedance between the user and the haptic output device 708.

As another example, in some embodiments, the computing device 702 may determine that haptic output device 708 may be too close to the user to output a quality haptic effect, for example, an electrostatic haptic effect such as simulated texture. In response, in some embodiments, the computing device 702 may apply a magnetic field to a smart gel associated with the strap 704 between the user and the haptic output device 708. The electromagnetic field may cause the smart gel to become rigid or deform, thereby moving the haptic output device 708 farther from the user. This may improve the quality of the haptic effect perceived by the user.

In some embodiments, the computing device 702 may comprise an actuation system (not shown) configured to tighten or loosen the strap 704 based on the impedance. The actuation system may comprise, for example, a motor with a rotor shaft coupled to the strap 704. The computing device 702 may cause the motor to rotate in either direction, thereby mechanically tightening or loosening the strap 704 around, for example, the user's wrist. For instance, if the computing device 702 determines the strap 704 is too tight for the haptic output device 708 to generate a quality haptic effect, the computing device 702 may rotate the motor to loosen the strap. If the computing device 702 determines the strap 704 is too loose, the computing device 702 may rotate the motor in the opposite direction to tighten the strap. Thus, the computing device 702 may be able to modulate the impedance, without altering the physical properties (e.g., elasticity, rigidity, or thickness) of the strap 704.

In some embodiments, the computing device 702 may be able to physically rotate the strap 704 around the user's body (e.g., the user's wrist). For example, the computing device 702 may comprise an actuation system, such as a motor coupled to the strap 704, configured to cause the physical position of the strap 704 to rotate clockwise or counterclockwise around the user's wrist. Rotating the strap 704 around the user's body may improve the impedance between the user and a haptic output device 708 positioned in the strap 704. In other embodiments, for example where the computing device 702 comprises the haptic output device 708 (e.g., rather than the strap 704), the computing device 702 may rotate itself around the user's wrist via an actuation system coupled to the strap 704.

Further, the computing device 702 may be able to rotate the strap 704 to output haptic effects to different portions of the user's body (e.g., the user's wrist). For example, the computing device 702 may rotate the strap 704 counterclockwise to output a haptic effect to the left side of the user's wrist when the computing device 702 determines the time is 9:00 PM. The computing device 702 may rotate the strap 704 clockwise to output a haptic effect on the right side of the user's wrist, for example, in response to a game event (e.g., the user's virtual game character getting shot on the right side).

In some embodiments, the computing device 702 may determine the position of the haptic output device 708 with respect to the user and/or the computing device 702 (e.g., via a gyroscope or accelerometer). For example, the computing device 702 may determine the position of the haptic output device 708 around the user's wrist. The computing device 702 may change the impedance and/or the haptic effect based at least in part on the determined position of the haptic output device 708. For example, in some embodiments, the computing device 702 may determine that the haptic output device 708 is positioned on the right or left sides of the user's wrist, which may be adjacent to a bone. In such an embodiment, the user may perceive a strong haptic effect against the user's bone as unpleasant. Thus, in some embodiments, the computing device 702 may determine no haptic effect or a haptic effect with a lower magnitude. In other embodiments, the computing device 702 may cause a compliant material between the user and the haptic output device 708 to thicken and/or become more rigid. This may prevent the user from experiencing an uncomfortable haptic effect.

Illustrative Methods for Impedance Coupling for Haptic Devices

Figure 8:
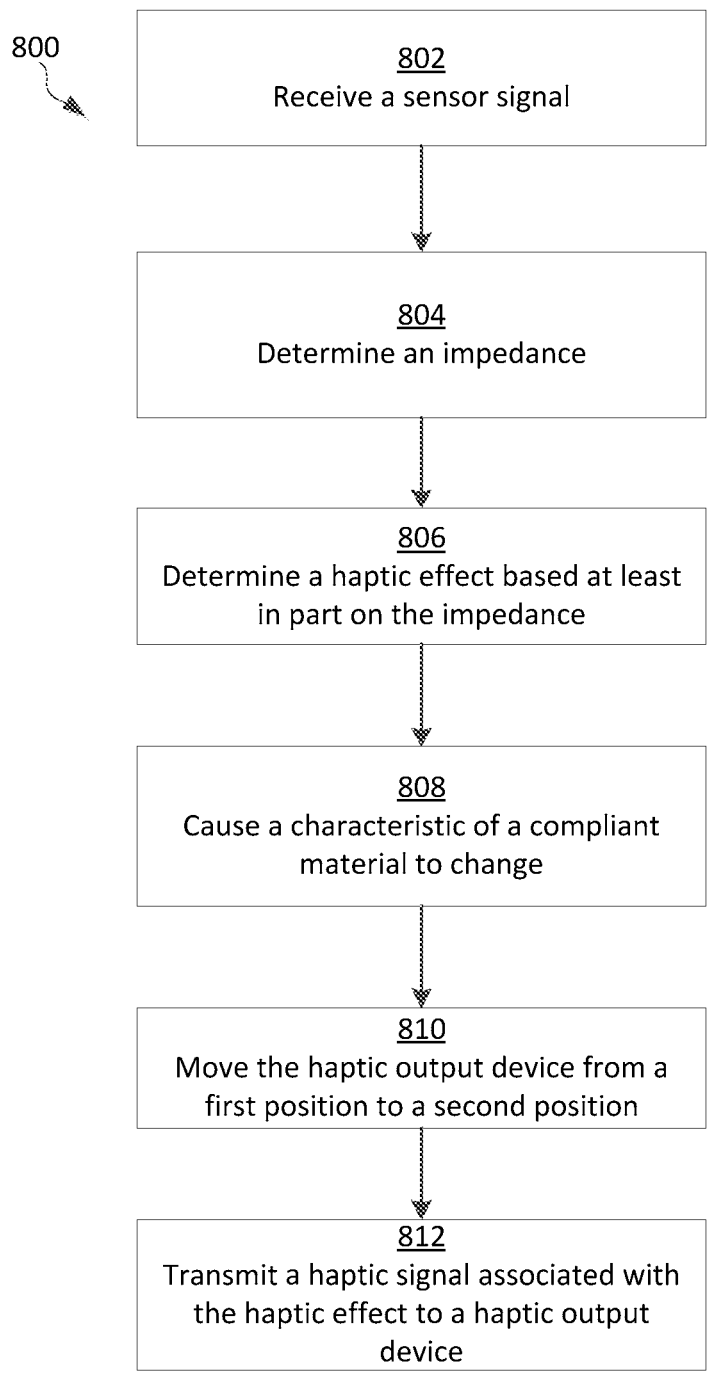
FIG. 8 is a flow chart of steps for performing a method for providing impedance coupling for haptic devices according to one embodiment.

FIG. 8 is a flow chart of steps for performing a method for providing impedance coupling for haptic devices according to one embodiment. In some embodiments, the steps in FIG. 8 may be implemented in program code that is executed by a processor, for example, the processor in a general purpose computer, a mobile device, or a server. In some embodiments, these steps may be implemented by a group of processors. In some embodiments one or more steps shown in FIG. 8 may be omitted or performed in a different order. Similarly, in some embodiments, additional steps not shown in FIG. 8 may also be performed. The steps below are described with reference to components described above with regard to system 100 shown in FIG. 1.

The method 800 begins at step 802 when the processor 102 receives a sensor signal from the impedance sensor 132. The sensor signal may be digital or analog. In some embodiments, the sensor signal may be associated with the amount of pressure with which a user is interacting a surface associated with the haptic output device 118. For example, the impedance sensor 132 may detect the amount of pressure with which the user is holding the mobile device. In other embodiments, the sensor signal may be associated with the surface area of a contact between the user and a surface associated with the haptic output device 118. For example, the impedance sensor 132 may detect the surface area of the contact between the user's hand and the mobile device as the user holds the mobile device. In some embodiments, the sensor signal may be associated with an electrical characteristic of a contact between the user and a surface associated with the haptic output device 118. For example, the impedance sensor 132 may detect a voltage, current, or resistance between the user's hand and the mobile device.

In some embodiments, the sensor signal may be associated with a response to an impulse (e.g., an electrical impulse, or a mechanical impulse such as a vibration) output by the computing device 101. For example, the computing device 101 may output an impulse (e.g., via electrodes or the haptic output device 118) to the user's hand as the user holds the mobile device. The impedance sensor 132 may detect a characteristic of how the user's skin responded to the impulse and transmit a sensor signal associated with the response. For instance, the impedance sensor 132 may detect a voltage across electrodes contacting the user's skin (e.g., via a voltage sensor) or the amount of vibration of the user's skin (e.g., via an accelerometer).

The method 800 continues at step 804 when the processor 102 determines an impedance based at least in part on the sensor signal. In some embodiments, the processor 102 may determine the impedance based on algorithms. For example, in some embodiments, processor 102 may access an algorithm stored in memory 104 and input parameters associated with the sensor signal to determine the impedance. For example, the processor 102 may determine the impedance based in part on the pressure or contact surface area detected by the impedance sensor 132.

In some embodiments, the processor 102 may determine the impedance based on a lookup table, e.g., stored in memory 104. The processor 102 may use the lookup table to determine an impedance associated with sensor signal data. For example, in some embodiments, the processor 102 may use the lookup table to determine an impedance associated with a contact surface area.

In some embodiments, the processor 102 may determine the impedance based on a characteristic associated with the user, e.g., the user's sex, or the thickness, amount of hair, moisture level (e.g., dry skin), ambient moisture level (e.g., the amount of liquid on the user's skin), or quality (e.g., pimples, bumps, or other deformations) of the user's skin. For example, in some embodiments, the user may be holding the mobile device while in the rain. The rain may generate ambient moisture on the user's skin, which may affect data captured by the impedance sensor 132. For example, as the user's skin becomes moist from the rain, the conductivity of the user's skin may increase. The processor 102 may detect the ambient moisture and determine the impedance, for example, by calibrating the sensor signal data to adjust for the ambient moisture on the user's skin.

The method 800 continues at step 806 when the processor 102 determines a haptic effect based at least in part on the impedance. In some embodiments, the processor 102 may rely on programming contained in haptic effect determination module 126 to determine the haptic effect. In some embodiments, haptic effect determination module 126 may comprise a lookup table. In some embodiments, processor 102 may use the lookup table to associate impedances with particular haptic effects (e.g., textures).

In some embodiments, the processor 102 may determine a haptic effect based on algorithms. For example, in some embodiments, processor 102 may access an algorithm stored in memory 104 and input parameters associated with the impedance to determine a haptic effect. For example, the processor 102 may apply an impedance to an algorithm to determine the magnitude of the haptic effect.

In some embodiments, the processor 102 may further determine the haptic effect based at least in part on one or more of: an event, a haptic profile, or a virtual object. For example, in some embodiments, the processor 102 may consult a lookup table to associate events with particular haptic effects. For example, in some embodiments, the user may be playing a game on the mobile device. The processor 102 may consult a lookup table and associate a game event, such as explosions, level completions, or gun shots, with a haptic effect comprising a vibration.

In some embodiments, users may have "haptic profiles" in which a user can determine and save in memory 104 a "profile" of the haptic effects the user would like associated with particular events. For example, in one embodiment, a user can select from a list of available haptic effects and associate one of these haptic effects with a virtual object output by the display 134. In some embodiments, the list may comprise, for example, haptic effects such as an intense vibration, a light vibration, or textures such as bumpy, rubbery, or smooth. In some embodiments, the processor 102 may consult with the user's haptic profile to determine which haptic effect to generate. For example, if the user's haptic profile associates interaction with a virtual object with an intense vibration, in response to the user placing a finger on the touch-screen display associated with the mobile device, the processor 102 may determine a haptic effect comprising an intense vibration.

The method 800 continues at step 808 when the processor 102 causes a characteristic of a compliant material to change. In some embodiments, the compliant material may comprise a smart gel, shape-memory alloy, or rheological fluid. The processor 102 may apply electricity, heat, a magnetic field, or an electric field to the compliant material to cause a characteristic of the compliant material to change. For example, in some embodiments, the user may be holding the mobile device in the user's hand. The mobile device may comprise a compliant material surrounding a haptic output device 118. In such an embodiment, to output a damped haptic effect, the processor 102 may apply electricity or an electric field to the compliant material, causing it to become more rigid. The rigid compliant material may tightly couple the haptic output 118 device to the computing device 101. This may dampen haptic effects output by the haptic output device. As another example, in some embodiments, the processor 102 may cause the compliant material to expand or compress. This may physically move the haptic output device 118 closer to or farther from the user, for example, increasing or decreasing the strength of haptic effects perceived by the user, respectively.

The method 800 continues at step 810 when the processor 102 moves the haptic output device 118 from a first position to a second position. In some embodiments, instead of changing a characteristic of a compliant material, the processor 102 may cause the haptic output device 118 to move from a first position to a second position. For example, in some embodiments, the user may be holding the mobile device in the user's hand. In such an embodiment, to output a vibration that the user perceives as high-magnitude, the processor 102 may transmit a signal to an actuation system (e.g., a motor) coupled to the haptic output device 118. The actuation system may receive the signal and physically move the haptic output device 118 from its current position to a new position closer to the back of the mobile device. In some embodiments, the user may perceive haptic effects as higher-magnitude if the haptic output device 118 is closer to the user's body (e.g., the user's hand or palm).

In other embodiments, in addition to changing a characteristic of a compliant material, the processor 102 may cause the haptic output device 118 to move from a first position to a second position. For example, in some embodiments, the user may be holding a mobile device comprising a compliant material. The compliant material may be positioned between the user's hand and the haptic output device 118 and may comprise a smart gel. In such an embodiment, to output a vibration that the user perceives as low-magnitude, the processor 102 may transmit a signal to the smart gel. This may cause the smart gel to change its shape, for example to become thicker, physically moving the haptic output device 118 from its current position to a new position farther from the user. In some embodiments, the user may perceive haptic effects as lower-magnitude if the haptic output device 118 is farther from the user's body (e.g., the user's hand or palm).

The method 800 continues at step 812 when the processor 102 transmits a haptic signal associated with the haptic effect to a haptic output device 118. The haptic output device 118 is configured to receive the haptic signal and output the haptic effect. For example, the haptic output device 118 may receive a haptic signal and output a haptic effect comprising, for example, a decrease in a perceivable coefficient of friction on the touch sensitive surface 116 and/or a vibration. Haptic effects may, for example, make interactions with the mobile device more immersive for the user.

Additional Embodiments of Systems for Impedance Coupling for Haptic Devices

Figure 9:
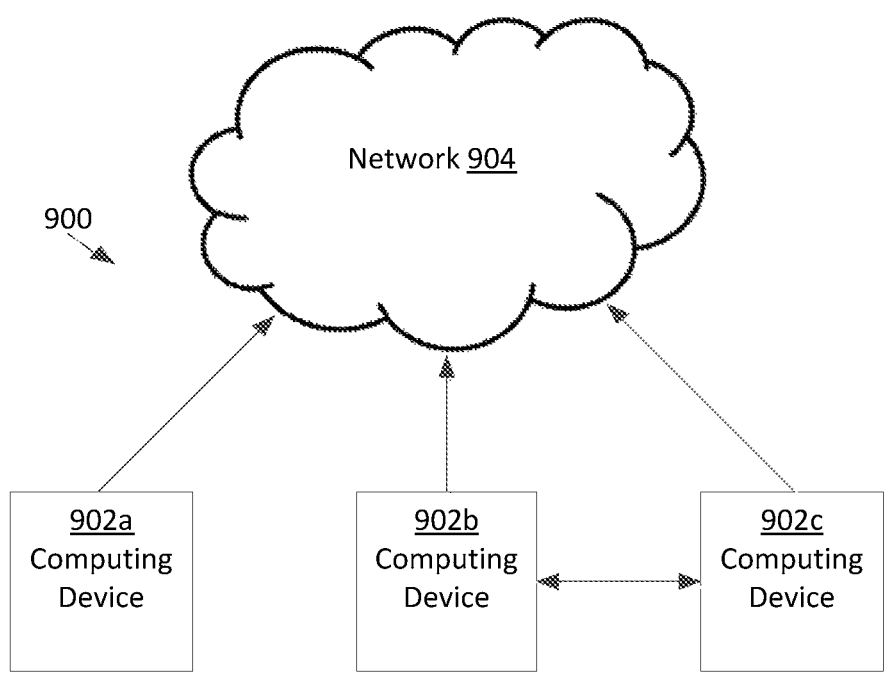
FIG. 9 shows another embodiment of a system for impedance coupling for haptic devices.

FIG. 9 shows another embodiment of a system for impedance coupling for haptic devices. The system 900 comprises one or more computing devices 902a-c. The computing devices 902a-c may be connected to a network 904. The network 904 may be any suitable number or type of networks or links, including, but not limited to, a dial-in network, a local area network (LAN), wide area network (WAN), public switched telephone network (PSTN), a cellular network, a WiFi network, the Internet, an intranet or any combination of hard-wired and/or wireless communication links. In some embodiments, the network 904 is a single network. In other embodiments, the network 904 may comprise two or more networks.

In some embodiments, the computing devices 902a-c may be configured to determine an impedance and/or haptic effect based on data received via the network 904. For example, a computing device 902a may be able to receive data about one or more components associated with the computing device 902a from a cloud computing application. In some embodiments, the computing device 902a may receive data about a haptic output device (e.g., the type of the haptic output device, such as an ERM, LRA, or smart gel), a housing material (e.g., rubber, plastic, metal, or glass), and/or a compliant material (e.g., rubber, foam, or plastic) associated with the computing device 902a. The computing device 902a may determine an impedance based on, for example, the housing material. For instance, the computing device 902a may determine a higher impedance if the housing material comprises a rubber material than if the housing material comprises a glass material. This may be because the user may achieve a better quality of contact when gripping a computing device 902a made of rubber than when gripping a computing device 902a made of glass (e.g., with the same amount of pressure).

In some embodiments, a computing device 902b may be configured to receive data, directly or via the network 904, from one or more other computing devices 902a, 902c. The computing device 902b may determine an impedance and/or haptic effect based on the data. For example, in some embodiments, a plurality of users may be playing a videogame via the network 904 while using the same type of computing device (e.g., a tablet with specific characteristics). A video game event (e.g., an explosion) may occur in which it may be desirable for all of the users to perceive a similar haptic effect (e.g., a rumble vibration output via the back of the computing device 902a-c). One of the computing devices 902a may determine an impedance (e.g., via an impedance sensor) and transmit the impedance to the other computing devices 902b-c. The other computing devices 902b-c may receive the impedance and output haptic effects with characteristics based on the impedance. This may allow the users to perceive similar haptic effects without each of the computing devices 902a-c making individual impedance determinations.

Advantages of Impedance Coupling for Haptic Devices

There are numerous advantages to impedance coupling for haptic devices. Such systems may provide an enhanced haptic experience while requiring less power. For example, rather than outputting a high-magnitude haptic effect, which may require significant power, the computing device may move the haptic output device closer to the user and output a lower-magnitude haptic effect. This may provide the user with a sufficiently intense haptic effect while requiring less power. As another example, in some embodiments, a computing device may cause a compliant material within which the haptic output device is suspended to become more elastic, thus allowing more haptic forces to be transmitted to the user. This may increase the strength of the haptic effect perceived by the user, without requiring high-power haptic signals.

In some embodiments, impedance coupling for haptic devices may improve the quality of the haptic effects perceived by the user. For example, in embodiments, a compliant material may be positioned between the user and the haptic output device. By positioning a compliant material between the user and the haptic output device, the haptic output device may remain sufficiently distant from the user to generate a quality haptic effect. As another example, rather than rigidly coupling a haptic output device to the computing device, which may dampen haptic forces, haptic output devices can be coupled to the computing device via elastic structures or structures that can change elasticity. This may allow for haptic forces to more efficiently be transmitted to the user.

In some embodiments, impedance coupling for haptic devices may provide a more immersive experience for users or increase the number of different haptic effects perceivable by a user. For example, in some embodiments, the computing device may be able to physically move the position of the haptic output device to a plurality of different locations with respect to the user. Thus, a user may be able to receive a variety of haptic effects from a broad range of positions with a single haptic output device. This may also reduce costs because a single haptic output device coupled an actuation system may replace a plurality of separate haptic output devices and associated hardware.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, in which other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
   a first haptic-output device configured to output a first type of haptic effect to a surface;
   a second haptic-output device configured to output a second type of haptic effect to the surface, wherein the second type of haptic effect is different from the first type of haptic effect;
   a sensor configured to detect an impedance of a contact between an object and the surface and transmit a sensor signal associated with the impedance;
   a processor in communication with the sensor; and
   a memory on which instructions executable by the processor are stored to cause the processor to:
      receive the sensor signal from the sensor;
      determine the impedance of the contact between the object and the surface based on the sensor signal;
      determine a first haptic effect based on an event, wherein the first haptic effect is the first type of haptic effect configured to be output by the first haptic-output device;
      determine a second haptic effect based on the first haptic effect and the impedance of the contact, wherein the second haptic effect is the second type of haptic effect configured to be output by the second haptic-output device; and
      transmit a haptic signal to the second haptic-output device to cause the second haptic-output device to output the second haptic effect to the surface.

2. The system of claim 1, wherein the processor and the sensor are coupled to a wearable device, and wherein the wearable device comprises a sleeve, a watch, an article of clothing, a hat, a jacket, gloves, a ring, jewelry, a collar, or glasses.

3. The system of claim 1, wherein a haptic output device and the processor are disposed within a housing, and wherein the memory further comprises instructions that are executable by the processor to cause the processor to apply a stimulus to a compliant material based on the impedance, wherein the stimulus is configured to cause the compliant material to move the haptic output device within the housing by changing in shape.

4. The system of claim 3, wherein the compliant material is positioned to be between the haptic output device and a user.

5. The system of claim 3, wherein the compliant material surrounds the haptic output device.

6. The system of claim 3, wherein the compliant material comprises a smart gel, shape-memory alloy, or rheological fluid.

7. The system of claim 1, further comprising an actuation system configured to physically move a location of a haptic output device in at least two dimensions by applying a force to the haptic output device;
wherein the memory further comprises instructions that are executable by the processor to cause the processor to operate the actuation system to physically move the location of the haptic output device in the at least two dimensions based on the impedance.

8. The system of claim 1, wherein the processor and the sensor are disposed in a wearable device configured to be worn around an object, the wearable device comprising an actuation system configured to physically tighten, loosen, or rotate the wearable device around the object in response to a signal from the processor.

9. The system of claim 8, wherein the sensor is positioned on a strap of the wearable device, and wherein the memory further comprises instructions that are executable by the processor to cause the processor to operate the actuation system based on the impedance of the contact to cause the wearable device to physically tighten, loosen, or rotate around the object.

10. The system of claim 9, wherein the wearable device is a watch and the strap is for the watch.

11. The system of claim 1, wherein the processor and a haptic output device are disposed within a housing, and wherein the memory further includes instructions that are executable by the processor to cause the processor to:
determine a position of the haptic output device (i) within the housing or (ii) with respect to a body part;
determine a haptic effect based at least in part on the determined position of the haptic output device; and
transmit a haptic signal to the haptic output device to cause the haptic output device to output the haptic effect.

12. The system of claim 1, further comprising a second sensor configured to detect an environmental characteristic and transmit a second sensor signal associated with the environmental characteristic, wherein the memory further comprises instructions that are executable by the processor to cause the processor to:
determine a haptic effect based at least in part on the environmental characteristic and the impedance of the contact; and
transmit a haptic signal to a haptic output device, the haptic signal being configured to cause the haptic output device to output the haptic effect.

13. The system of claim 1, wherein the memory further comprises instructions that are executable by the processor to cause the processor to:
determine that the impedance of the contact is beyond a threshold value; and
in response to the impedance of the contact being beyond the threshold value, prevent the output of the first haptic effect and determine the second haptic effect.

14. A method comprising:
receiving, from a sensor and by a processor, a sensor signal indicating an impedance of a contact between an object and a surface;
determining, by the processor, the impedance of the contact between the object and the surface based on the sensor signal;
determining, by the processor, a first haptic effect based on an event, wherein the first haptic effect is a first type of haptic effect to be output by a first haptic-output device;
determining, by the processor, a second haptic effect based on the first haptic effect and the impedance of the contact, wherein the second haptic effect is a second type of haptic effect to be output by a second haptic-output device, and wherein the second type of haptic effect is different from the first type of haptic effect; and
outputting, by the processor, the second haptic effect using the second haptic-output device.

15. The method of claim 14, wherein the processor and the sensor are coupled to a wearable device, and wherein the wearable device comprises a sleeve, a watch, an article of clothing, a hat, a jacket, gloves, a ring, jewelry, a collar, or glasses.

16. The method of claim 14, further comprising applying a stimulus to a compliant material to change a physical shape of the compliant material based on the impedance of the contact, wherein the compliant material comprises a smart gel, a shape-memory alloy, or a rheological fluid.

17. The method of claim 14, wherein the processor and a haptic output device are disposed within a housing, and further comprising:
transmitting a signal to an actuation system based on the impedance; and
moving the haptic output device, by the actuation system and in response to the signal, in at least two dimensions within the housing by applying a force to the haptic output device.

18. The method of claim 17, wherein the sensor is disposed within a wearable device configured to be worn around an object, and further comprising operating an actuation system based on the impedance of the contact to cause the wearable device to physically tighten, loosen, or rotate the around the object.

19. A non-transient computer readable medium comprising program code, which when executed by a processor is configured to cause the processor to:
receive, from a sensor, a sensor signal indicating an impedance of a contact between an object and a surface;
determine the impedance of the contact between the object and the surface based on the sensor signal; and
determine a first haptic effect based on an event, wherein the first haptic effect is a first type of haptic effect to be output by a first haptic-output device;
determine a second haptic effect based on the first haptic effect and the impedance of the contact, wherein the second haptic effect is a second type of haptic effect to be output by a second haptic-output device, wherein the second type of haptic effect is different from the first type of haptic effect; and transmit a haptic signal to the second haptic-output device to cause the second haptic-output device to output the second haptic effect to the surface.

20. The non-transient computer readable medium of claim 19, wherein the sensor is coupled to a wearable device, and wherein the wearable device comprises a sleeve, a watch, an article of clothing, a hat, a jacket, gloves, a ring, jewelry, a collar, or glasses.

21. The non-transient computer readable medium of claim 19, further comprising program code that is executable by the processor to cause the processor to change a characteristic of a smart gel, a shape-memory alloy, or a rheological fluid associated with the surface based on the impedance of the contact.

* * * * *